United States Patent [19]

Ito

[11] Patent Number: 5,016,548
[45] Date of Patent: May 21, 1991

[54] METHOD OF PLANTING SEEDLINGS

[76] Inventor: Yoshihide Ito, No. 406, Sun Heights Hozumi, 4-5-11, Kasuga, Ibaragi-shi, Osaka-fu, Japan

[21] Appl. No.: 584,504

[22] Filed: Sep. 17, 1990

Related U.S. Application Data

[63] Continuation of Ser. No. 316,950, Feb. 28, 1989, abandoned.

[30] Foreign Application Priority Data

Mar. 4, 1988 [JP] Japan .................. 63-50645

[51] Int. Cl.$^5$ .................. A01C 11/02; A01G 9/10
[52] U.S. Cl. .................. 111/114; 111/900; 47/48.5; 47/77; 47/79
[58] Field of Search .................. 47/62, 63, 59, 73, 74, 47/77, 78, 79, 82, 27, 48.5; 111/106, 114, 115, 92, 900

[56] References Cited

U.S. PATENT DOCUMENTS

| | | | |
|---|---|---|---|
| 532,687 | 1/1895 | Malhaupt | 47/73 |
| 1,959,139 | 5/1934 | Otwell | 47/77 |
| 3,057,116 | 10/1962 | Szochet | 47/48.5 |
| 3,109,258 | 11/1963 | Jensen | 47/48.5 |
| 4,031,832 | 6/1977 | Edwards | 47/77 |
| 4,192,096 | 3/1980 | Platt | 47/77 |
| 4,216,621 | 8/1980 | Olsen | 47/73 |
| 4,296,569 | 10/1981 | Edwards | 47/73 |
| 4,457,102 | 7/1984 | Ploeger | 111/114 X |
| 4,665,645 | 5/1987 | Schau et al. | 47/48.5 |
| 4,843,758 | 7/1989 | Raczkowski | 47/48.5 |

FOREIGN PATENT DOCUMENTS

| | | | |
|---|---|---|---|
| 2501543 | 7/1976 | Fed. Rep. of Germany | 47/79 |
| 2267698 | 12/1975 | France | 47/48.5 |
| 623721 | 6/1981 | Switzerland | 47/27 |

Primary Examiner—Danton D. DeMille
Attorney, Agent, or Firm—Larson and Taylor

[57] ABSTRACT

Seedlings are planted in dry areas containing water at a lower level by i) determining the depth of the water-containing level; ii) selecting a seedling breeder having a length corresponding to the depth of the water-containing level, said breeder comprising an elongated cylindrical body having an opened upper end, a plurality of openings in the periphery of at least the lower portion of the body, a length which corresponds to the depth of water-containing soil in said planting place, means covering said plurality of openings and a thin tube extending to the deep portion of said body for supplying water thereto; iii) filling said seedling breeder with culture soil; iv) planting the seedling in the seedling breeder; v) breeding the planted seedling in the breeder until the roots of the seedling reach said plurality of openings; vi) removing said cover means; and vii) implanting the breeder in a seedling planting place by inserting the breeder into the ground of said planting place.

4 Claims, 3 Drawing Sheets

METHOD OF PLANTING SEEDLINGS

This application is a continuation of application Ser. No. 07/316,950 filed on Feb. 28, 1989 now abandoned.

BACKGROUND OF THE INVENTION

The present invention relates to an improved method of planting seedlings, more particularly to a novel method of reliably and positively planting seedlings in areas such as dried lands, deserts or wastelands where it is difficult or impossible to cultivate seedlings by conventional methods.

In planting seedlings, it was conventional to cultivate or breed the seedlings in a seedbed or a hot bed, to dig out the cultivated seedlings therefrom, to transport the digged out seedlings to the place to be planted, and to dig holes in the ground to plant them.

The prior method, however, involves the following serious inevitable difficulties.

(1) The seedlings, even if growable to large trees, are very infirm and lack spontaneity when they are young so that it is difficult for them to withstand sudden changes of conditions. For instance, the growth of seedlings is extremely difficult where the place to be planted is under severe conditions such as intense heat, coldness or dryness without sufficient water.

(2) In addition to the sudden change of habitat from a seedbed or hot bed of satisfactory conditions to a planting place of under severe conditions, the seedlings are heavily injured in transplantation by that portions of roots are cut off or plucked off.

(3) In cases where the place to be planted is a desert or a dried area close to a desert, the roots of seedlings are immediately exposed to danger of being dried since the lengths of the roots are from ten to several tens centimeters at the most. Furthermore, in a dry season in a desert of strong sunshine or a torrid zone, the portions of the soil at the level of from ten to several tens centimeters under the ground surface become red-hot by solar heat in addition being dried so that the rootlets of the seedlings are withered far from growth. Under such severe conditions, frequent irrigations are even ineffective.

SUMMARY OF THE INVENTION

The present invention relates to a method of planting seedlings made for eliminating above described various difficulties of prior method.

The present invention was made in view of the fact that even in barren areas unsuitable for planting seedlings such as deserts, dried areas close to the desert or torrid zones where the amount of rainfall is small, there is water required for the growth of seedlings and there are many soil portions where the plants can extend their roots deep into the soil in the level of 50–100 centimeters or 100–500 centimeters under the ground surface.

A main object of the present invention is to provide a method of planting seedlings which ensures the planting and growth of seedlings and prevents desertion of the earth due to disordered deforestation and which contributes to afforestation of deserts.

In order to accomplish the above described object, according to the present invention, there is provided a method of planting seedlings in a desired place comprising the steps of using as a seedling breeder a cylindrical body of a required length and having a plurality of openings in the periphery of at least the lower portion of the body and an opened upper end, filling culture soil in the seedling breeder, planting the seedling in the culture soil in the seedling breeder, breeding the planted seedling in the breeder for a required period of time, implanting the breeder in a seedling planting place by suitably inserting the breeder into the ground of the planting place.

According to such method, the following advantages are brought about.

The roots of the seedlings as transplanted from a seedbed to the culture soil in the breeders satisfactorily grow downwards along the breeder under the conditions suitable for the growth and the seedlings grow up without cutting off of the roots to young trees having enough ability of withstanding the natural conditions or circumstances.

Furthermore, the length of the seedling breeder is selected correspondingly with the conditions of a planting place, especially the depth of water containing soil, and the seedlings as grown up to the young trees as described above are planted into the soil without being removed from the breeders so that cutting off and drying of roots which are fatal serious problems never arise and completely satisfactory planting is realized.

The roots of the young trees as planted as described above flourishingly grow through the openings formed in periphery of the lower portion of the breeder with seeking water so that in spite of a spell of dry weather, depauperation or withering will not arise.

Still further, by forming the seedling breeders of material which will be weakened and decayed upon lapse of time, the breeders implanted in the ground will become fragile and rotten upon lapse of time and conjointly with the growth of the roots the breeders will be broken so that will not prevent the growth of the young trees beyond the breeders.

At this stage, even if the planting place is in desert, the ends of main roots of seedlings have already reached or extended to the water containing level of the ground so that the seedlings will not be depauperated or withered even if the irrigation is stopped. Even if the breeder is not broken after the lapse of substantial time, the breeder will not prevent the growth of the plants since their roots can extend out of the breeder through the openings formed in the lower portion thereof.

Further still, by using as an irrigation means a thin tube inserted deep into the breeder and inserting an irrigation tube through the thin tube as disclosed in FIGS. 5 and 6, the precious water is directly supplied to the root portions extending deep in the breeder without being supplied to the upper portion of the breeder where the water is easily vanished by the solar heat, resulting in an efficient irrigation.

As apparent from above described various advantages, according to the method of planting seedlings of the present invention, the acceleratively proceeding desertion of the earth in these days due to disordered deforestation, etc. may be effectively prevented and it is possible to greatly contribute to the forestation of the earth.

BRIEF EXPLANATION OF THE DRAWINGS

The drawings show an embodiment of the present invention, wherein.

DETAILED EXPLANATION OF EMBODIMENT

Figure 1:
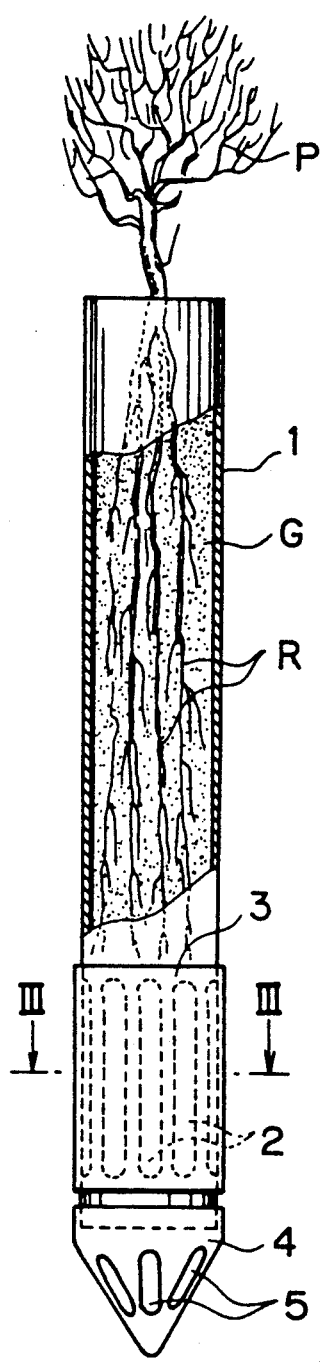
FIG. 1 is a partial sectional front view of a seedling breeder showing a growing state of a transplanted seedling.

An embodiment of the present invention will now be described with referring to FIGS. 1-7.

The reference numeral (1) designates a seedling breeder used in the present invention and it is formed, in this embodiment, of a material which is weakened and decayed in the ground upon lapse of short time, such as plastic material, wooden material, canvas, thick non-woven fabric, or other material weakened and decayed upon lapse of time. The breeder is a cylindrical body of a required length having its opposite ends being opened and formed in the periphery with a plurality of elongate openings (2) extending from the lower portion toward the intermediate portion of the body. The reference numeral (3) designates a cover fitted on the lower portion of the seedling breeder (1) and it closes the openings (2) when required to prevent flowing out of culture soil and to prevent insufficient growth of the roots in the growing period due to negative phototropism. The cover (3) is made of a suitable material such as plastic material and formed in the shape of a short tube attachable on and removable from the breeder (1). The reference numeral (4) designates a cap (4) having pointed end and removably attached to the lower tip end of the seedling breeder (1) and is made of a hard material such hard plastic material or metal and it prevents falling out and flowing out of the culture soil from the opening in the lower end of the seedling breeder (1) and is useful when the breeder (1) is driven into ground to be implanted therein. The cap (4) is formed with a plurality of openings (5) in its periphery for the drainage of water and for allowing extending out of the roots of the seedling. Though the cap (4) is not absolutely necessary in the case where holes are dug in the ground and the breeders (1) are inserted into the holes, it may be attached to the breeder (1) even in such cases to prevent falling out of culture soil from the lower end opening of the breeder. Though not illustrated in the drawings, the cap (4) may be formed integral with the breeder (1).

Now one of the methods of planting the seedlings using the above described seedling breeder (1) will be described.

Figure 2:
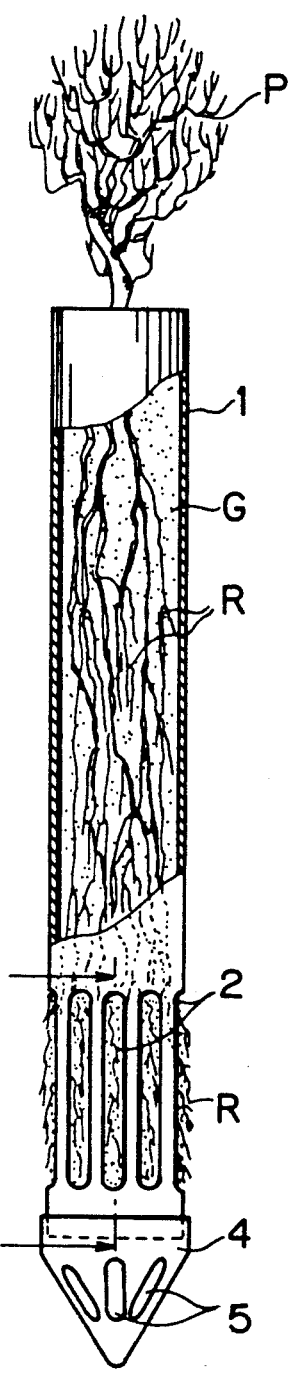
FIG. 2 is a view of seedling breeder similar to FIG. 1 with a cover being removed.
Figure 3:
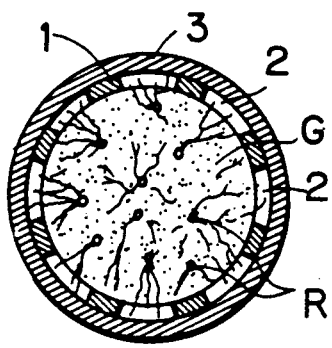
FIG. 3 is an enlarged cross-sectional view taken on line III—III of FIG. 1.
Figure 4:
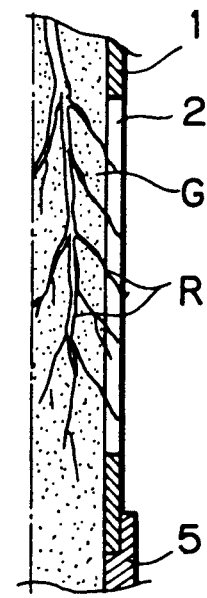
FIG. 4 is an enlarged longitudinal sectional view of a part of FIG. 2 taken on line IV—IV.
Figure 7:
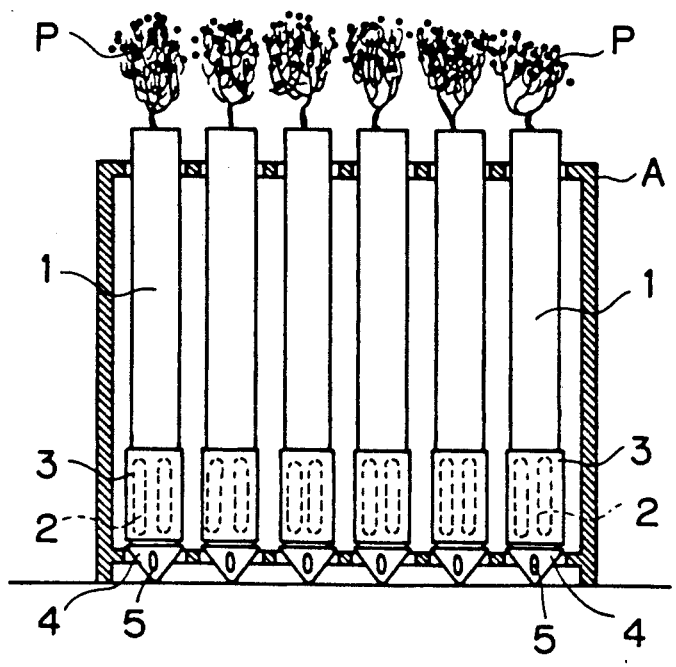
FIG. 7 is vertical sectional view of a breeder holding frame for breeding the seedlings.

In the first place, the length and diameter of the seedling breeders (1) are selected in accordance with the conditions in planting place and these breeders (1) are held upright in a seedbed as shown in FIG. 7 with using a holding frame (A) or without using such holding frame. Culture soil (G) mixed with a fertilizer and a water retention material such as rock wool is filled in the breeder (1) and a seedling (P) is planted in the upper portion of the filled culture soil (G). In this state, the seedlings are cultivated for a required period of time under the fittest conditions of temperature, degree of sunshine, water amount, permeability etc. Then the roots (R) of the seedlings are allowed to grow downwards along the cylindrical breeders (1) to the length compatible with the conditions of the planting place, especially the water distribution. For instance, in a case where water of the amount required for the growth of the plants exists 2 meters under the ground surface of the planting place, the seedling breeder (1) of about 2 meters are used and the seedlings are cultivated in the seedbed under the above described fittest conditions until the tip ends of the roots (R) grow to about 2 meters to reach to the openings (2) as shown in FIGS. 2-4, resulting in breeding of the seedlings to young trees having enough ability to withstand natural conditions or circumstances depending on the volume or capacity of the breeders (1).

Figure 5:
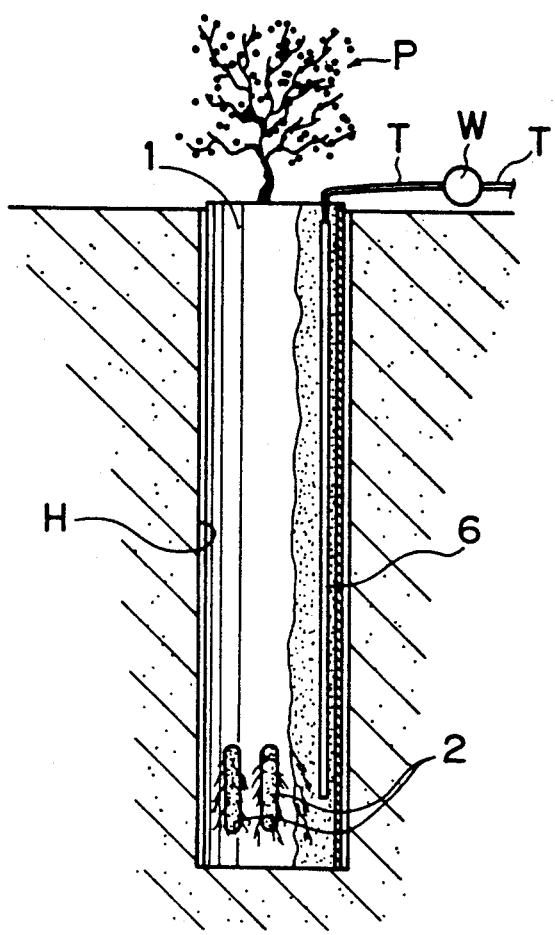
FIG. 5 is a partial sectional view of a seedling breeder which has been implanted in the ground.

Then, by using a suitable digging machine, holes (H) of slightly shorter length and slightly larger diameter than the breeders (1) are, dug in a planting place, the covers (3) are removed from the breeders (1) as shown in FIG. 5, and also the caps (4) are removed from the breeders (1) when required, and then the breeders (1) are inserted into the holes (H) and earth and sand or the likes is filled into the gap between the inner faces of the holes (H) and the outer faces of the breeders (1) to complete planting.

As means for irrigation after the planting, a measure could be taken, as shown in FIG. 5, wherein a thin tube (6) is inserted deep into the breeder (1) and the tip end of an irrigation tube (T) having a water distributor (W) connected therein is inserted into the thin tube (6) to irrigate when required. With such arrangement, precious water may be supplied directly to the root portions extending deep in the culture soil without supplying the water to the upper portion of the breeders where the water is easily vanished or evaporated due to the solar heat so that effective irrigation may be effected with a small amount of water. Therefore, such irrigation means is especially economic and effective in the places such as deserts or dry areas where water is not easily available. The thin tube (6) may be prefixed to the inner face of the breeder (1).

Though different depending on the material of the breeder (1), it becomes weakened and fragile upon lapse of time and conjointly with flourishing growth of the roots of young tree, it will be broken after the planting so that the roots may freely grow into the ground seeking for water, and, therefore, the roots are not depauperated or withered even if the irrigation is stopped. Furthermore, even if it has taken a long time before the breakage of the breeder (1), the main roots (R) extend out through the openings (2) of the breeder (1) so that there will arise no hindrance for the life of the planted plants.

Figure 6:
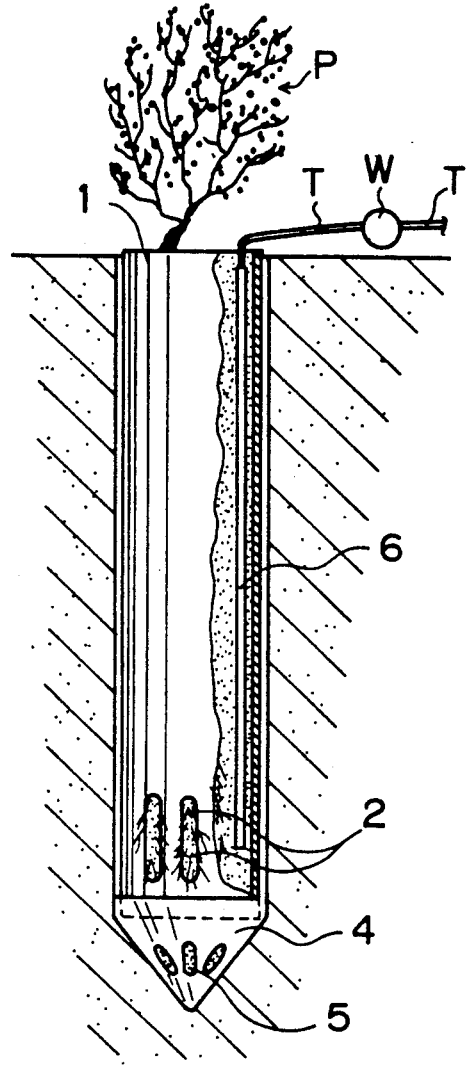
FIG. 6 is a partial sectional view of a seedling breeder which has been implanted in the ground by another method.

In a case where the planting place of seedlings is sandy as in deserts, dry riverbeds, etc., the holes dug by means of a digging machine may not maintain the hole configuration. In such cases, it is desirable to drive the breeder (1) by means of a driving machine with the state that the cap (4) is attached to the breeder (1) as shown in FIG. 6.

Figure 8:
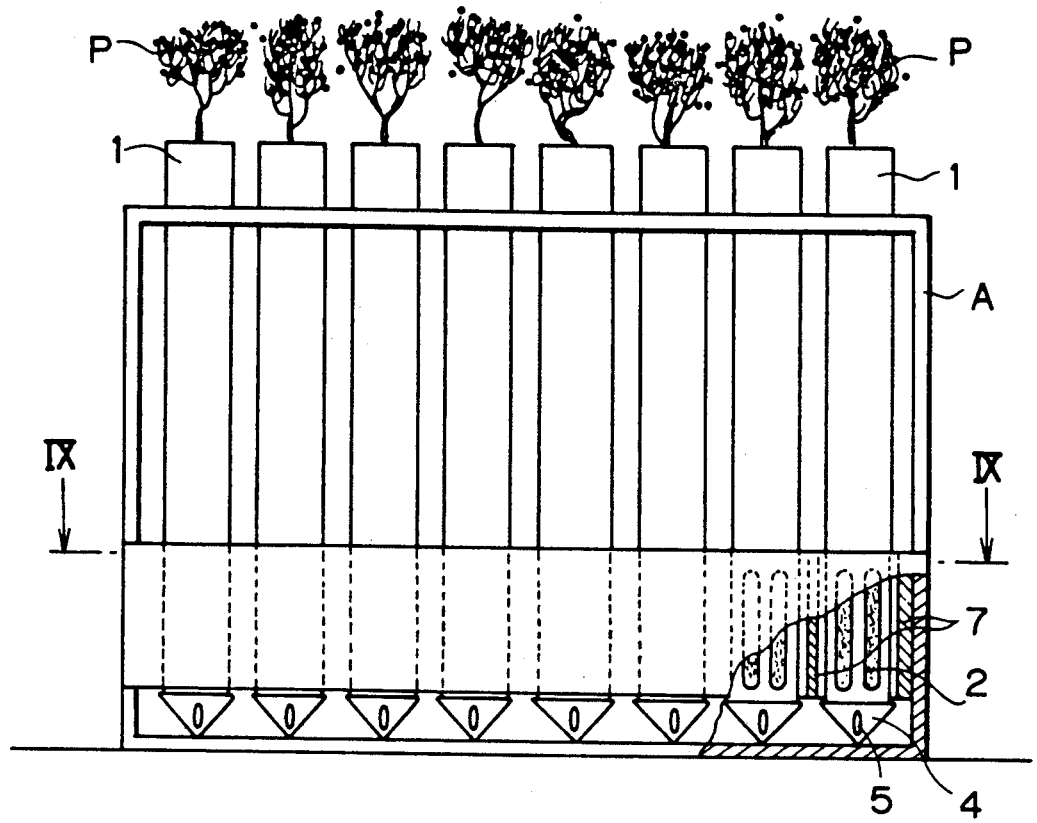
FIG. 8 is a vertical sectional view of a breeder holding frame of another design.
Figure 9:
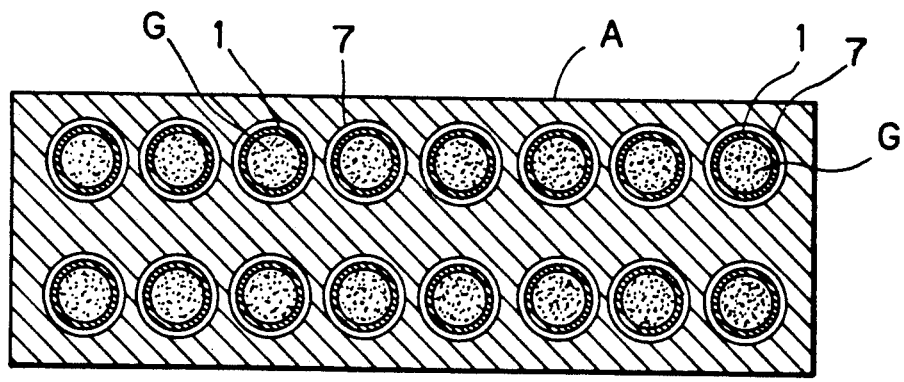
FIG. 9 is a cross-sectional view taken on line IX—IX of FIG. 8.

FIGS. 8 and 9 show another example of breeder holding frame (A). This holding frame (A) comprises in its lower portion sleeves (7) which close the openings (2) in the lower portions of the breeders (1) and function like the covers (3) so that with the use of such holding frame (A) it is possible to ensure the light shield for the roots of seedlings and prevention of damages to the roots which are the expected functions of the cover (3) and to ensure effective planting.

In the above, a preferred embodiment of the present invention has been described. The present invention, however, is not limited to the disclosed embodiment. For instance, the arrangement and the shape of the openings (2) in the breeder (1) may be suitably selected. The openings (2) may be circular, polygonal, or long sideways. Furthermore, the cap (4) as attached to the lower end of the breeder (1) may be integral with the breeder (1).

Still further, when the cap (4) is not used, a bottom plate having openings may be attached to the lower end opening of the breeder (1) or the lower end opening may be closed. To sum up, the constructions of various parts of the breeder (1) and holding frame (A) used in the present invention and their materials may be selected within the scope of the present invention. It should be understood by those skilled in the art that the foregoing and other changes in form and details can be made therein without departing from the spirit and scope of the invention. The scope of the invention is therefore to be determined by the appended claims.

What is claimed is:

1. A method of planting a seedling in a seedling planting place comprised of an area dry in the upper levels but containing water at a lower level, comprising
   (i) determining the depth of the water-containing level;
   (ii) selecting a seedling breeder having a length corresponding to the depth of the water-containing level, said breeder comprising an elongated cylindrical body having an opened upper end, a plurality of openings in the periphery of at least the lower portion of the body, a length which corresponds to the depth of water-containing soil in said planting place, means covering said plurality of openings and a thin tube extending to the deep portion of said body for supplying water thereto;
   (iii) filling said seedling breeder with culture soil;
   (iv) planting the seedling in the seedling breeder;
   (v) breeding the planted seedling in the breeder until the roots of the seedling reach said plurality of openings;
   (vi) removing said cover means; and
   (vii) implanting the breeder in a seedling planting place by inserting the breeder in to the ground of said planting place.

2. A method as claimed in claim 2, wherein the lower end of the breeder is opened.

3. A method as claimed in claim 1, wherein the lower end of the breeder is opened and a cap of hard material having a pointed end is removably attached to the opened lower end of the breeder.

4. A method as claimed in claim 1, wherein the breeder is made of a material which is weakened and decayed in the ground upon lapse of time.

* * * * *